US012760859B2

(12) United States Patent
Macorini et al.

(10) Patent No.: US 12,760,859 B2
(45) Date of Patent: Oct. 13, 2026

(54) AUTOMOTIVE LIGHTING UNIT

(71) Applicant: Marelli Automotive Lighting Italy S.p.A. Con Socio Unico, Venaria Reale (IT)

(72) Inventors: Guido Macorini, Tolmezzo (IT); Marco Svettini, Tolmezzo (IT)

(73) Assignee: Marelli Automotive Lighting Italy S.p.A. Con Socio Unico, Venaria Reale (IT)

(*) Notice: Subject to any disclaimer, the term of this patent is extended or adjusted under 35 U.S.C. 154(b) by 0 days.

(21) Appl. No.: 19/331,538

(22) Filed: Sep. 17, 2025

(65) Prior Publication Data

US 2026/0078886 A1 Mar. 19, 2026

(30) Foreign Application Priority Data

Sep. 17, 2024 (EP) .................................... 24200842

(51) Int. Cl.

*F21S 43/40* (2018.01)
*F21S 43/14* (2018.01)
*F21S 43/20* (2018.01)

(52) U.S. Cl.

CPC ............ *F21S 43/401* (2024.05); *F21S 43/14* (2018.01); *F21S 43/26231* (2024.05); *F21S 43/26261* (2024.05)

(58) Field of Classification Search

CPC .............. F21S 43/14; F21S 43/20–402; F21W 2102/30; F21W 2103/40; G02B 19/0061

See application file for complete search history.

(56) References Cited

U.S. PATENT DOCUMENTS

| | | | | |
|---|---|---|---|---|
| 8,419,232 | B2 * | 4/2013 | Minano ................ | F21S 41/285 362/300 |
| 10,401,621 | B2 * | 9/2019 | Wierich ............ | G02B 17/0621 |

* cited by examiner

*Primary Examiner* — Jason M Han

(74) *Attorney, Agent, or Firm* — McCarter & English, LLP

(57) ABSTRACT

An automotive lighting unit comprising: a rear casing adapted to be fixed to the vehicle; a front half-shell with a substantially transparent structure, which is arranged to close the mouth of said rear casing; and at least one lighting assembly, which is located inside the rear casing so as to backlight the front half-shell and comprises Kohler optics, which is interposed between the light source and the front half-shell, so as to be crossed by the light beam coming from the light source, and is structured so as to give, to the light beam reaching the front half-shell, a pre-established shape determined by the shape of the lenses that contribute to form said Kohler optics.

19 Claims, 5 Drawing Sheets

AUTOMOTIVE LIGHTING UNIT

CROSS-REFERENCE TO RELATED APPLICATIONS

This patent application claims priority from European Patent Office Application No. 24200842.3 filed on Sep. 17, 2024, the entire disclosure of which is incorporated herein by reference.

TECHNICAL FIELD

The present invention relates to an automotive lighting unit.

More specifically, the present invention advantageously relates to a taillight for cars and similar motor vehicles, which implements the rear fog light function. In other words, the automotive lighting unit is a particular lighting apparatus that is to be placed in the rear part of a car or other road motor vehicle and is capable of emitting a particularly strong and directed light beam, which has the function of signalling to other road users the position of the vehicle in the presence of fog, storms (heavy rain), heavy snowfall, sand storms and/or other poor-visibility environmental conditions.

Use to which the following description will make explicit reference without thereby losing generality.

Preferably, the present invention also relates to a pre-configured rear fog lighting module, which is adapted to be incorporated into a multi-function automotive lighting unit, or rather into a multi-function taillight for cars and similar motor vehicles.

BACKGROUND

As is well known, the rear fog light of a taillight for cars and similar motor vehicles is a particular light beam, usually red in colour, which is more intense than the light normally emitted by the taillights of cars and similar motor vehicles, and it is used to signal the presence/position of the vehicle in event of fogs, storms, heavy snowfalls, or other poor-visibility environmental conditions.

In view of the higher intensity of the light emitted by the taillight and the resulting problems (risk of dazzle to following vehicles), the light beam with rear fog light function must comply with particular photometric type-approval specifications, which place strict and rigid restrictions on colour, light intensity, and spatial distribution of the light beam emitted by the automotive lighting unit.

More specifically, the light beam with rear fog light function emitted by the taillight must currently comply with the photometric type-approval specifications required by the FMVSS/SAE J1319 and/or UNECE-R38 regulations.

These restrictions ensure that the light beam emitted by the automotive lighting unit can perform the required function (rear fog light), while minimizing the dazzle risks to other road users.

Taillights with rear fog light function for cars and similar motor vehicles usually comprise: a rigid and substantially basin-shaped, rear casing, which is made of opaque polymeric material and is structured so as to be firmly recessed into a compartment specially made in the rear part of the vehicle body; a rigid and substantially lenticular-shaped, front half-shell, which is made of transparent (to visible light) and optionally also coloured (in red) polymeric material, and is arranged to close the mouth of the rear casing, usually so as to surface outside of the vehicle body; and a particular electrically-powered lighting assembly, which is located inside the rear casing, beneath the front half-shell, and is selectively adapted to backlight the front half-shell, thereby emitting a light beam compliant with the photometric specifications provided for the rear fog light.

More specifically, the FMVSS/SAE J1319 and/or UNECE-R38 regulations set that the light beam with rear fog light function must have a light-intensity spatial distribution that, in a conventional isocandela diagram centred on the taillight optical axis, can be schematically represented by a roughly rhomboidal quadrilateral with the longest diagonal arranged horizontally. Clearly, the light intensity takes its maximum value within the perimeter of the rhomboidal quadrilateral. In addition, the length of the longest horizontal diagonal of the rhomboidal quadrilateral must be roughly twice the length of the shortest vertical diagonal.

Obviously, the taillight may also include other electrically-powered lighting assemblies, which are capable of emitting, on command, additional light signals adapted to indicate the presence and/or outline of the vehicle, the activation of the vehicle's brakes, the vehicle's turning direction, the engagement of the reverse gear, etc., or emit light to illuminate the area around the vehicle.

Currently, the structure of the lighting assembly producing the rear fog light is similar to that of the other lighting assemblies incorporated in the automotive lighting units and includes: a concave reflector body, generally made of opaque polymeric material, which is arranged close to the back of the rear casing and is provided with a substantially semi-parabolic reflecting surface with a complex three-dimensional profile, which is oriented so as to reflect the incident light towards the facing front half-shell; and one or more LEDs (acronym for Light Emitting Diodes), which are located beside the reflector body, generally on a same printed circuit board, so that the LED(s) can direct the produced light towards the reflecting surface of the reflector body. This light is then reflected and directed towards the front half-shell by the reflecting surface of the reflector body.

Unfortunately, to comply with the photometric type-approval specifications provided for the rear fog light, the lighting assembly must be equipped with very powerful and expensive LEDs, capable of producing a very strong light beam. At present, in fact, only the central part of the light beam coming from the reflector body has a light intensity and distribution compliant with the photometric type-approval specifications provided for the rear fog light.

In other words, much of the light produced by the LEDs of the lighting assembly does not contribute to complying with the photometric type-approval specifications provided for rear fog lights and must be adequately shielded, with all problems that this entails in terms of efficiency.

Furthermore, the assembling of the lighting assemblies with rear fog light function is relatively more complicated and expensive, as it requires more stringent mounting tolerances than those normally associated with the lighting assemblies performing other functions. In fact, even a slight misalignment between the reflector body and the LED(s) of the lighting assembly and/or the shielding mask is enough to generate a light beam that is not suitable for the purpose, i.e. it is not suitable for generating a light beam compliant with the photometric type-approval specifications provided for the rear fog light.

Due to these limitations, at present the lighting assembly of the rear fog light is designed from scratch for every new taillight model, with the consequent direct and indirect costs.

SUMMARY

The aim of the present invention is to provide a lighting assembly for a rear fog light, which is more efficient, i.e.

which can comply with the photometric type-approval specifications provided for rear fog lights while minimizing the amount of unused light and is also simpler and cheaper to assemble.

In accordance with these aims, according to the present invention there is provided an automotive lighting unit as defined in claim 1 and preferably, though not necessarily, in any one of the claims dependent thereon.

BRIEF DESCRIPTION OF THE DRAWINGS

The present invention will now be described with reference to the accompanying drawings, which illustrate a non-limiting embodiment thereof, wherein.

DETAILED DESCRIPTION OF THE INVENTION

Figure 1:
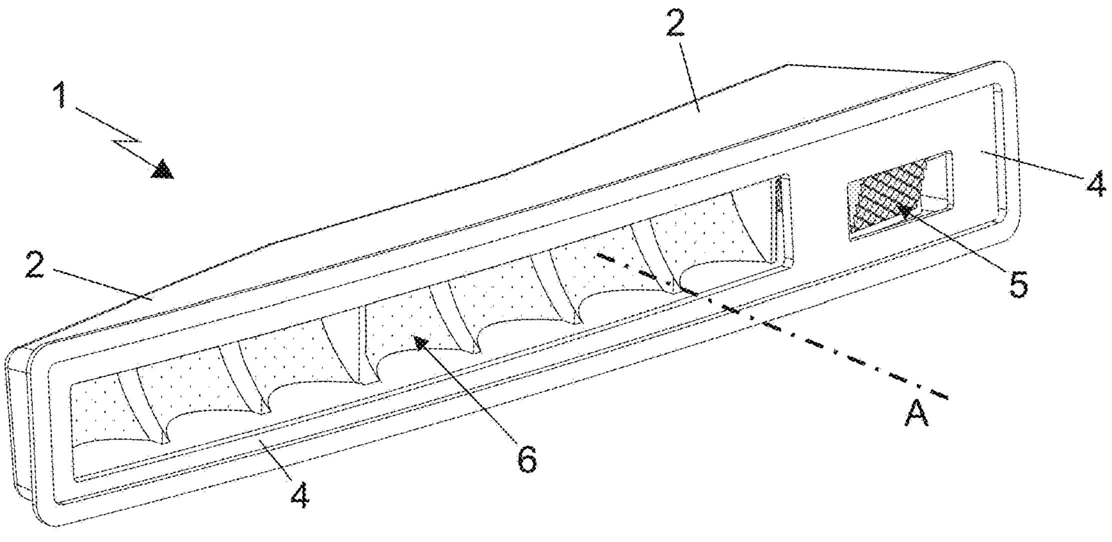
FIG. 1 is a perspective view of an automotive lighting unit realized according to the teachings of the present invention, with parts removed for clarity's sake.
Figure 2:
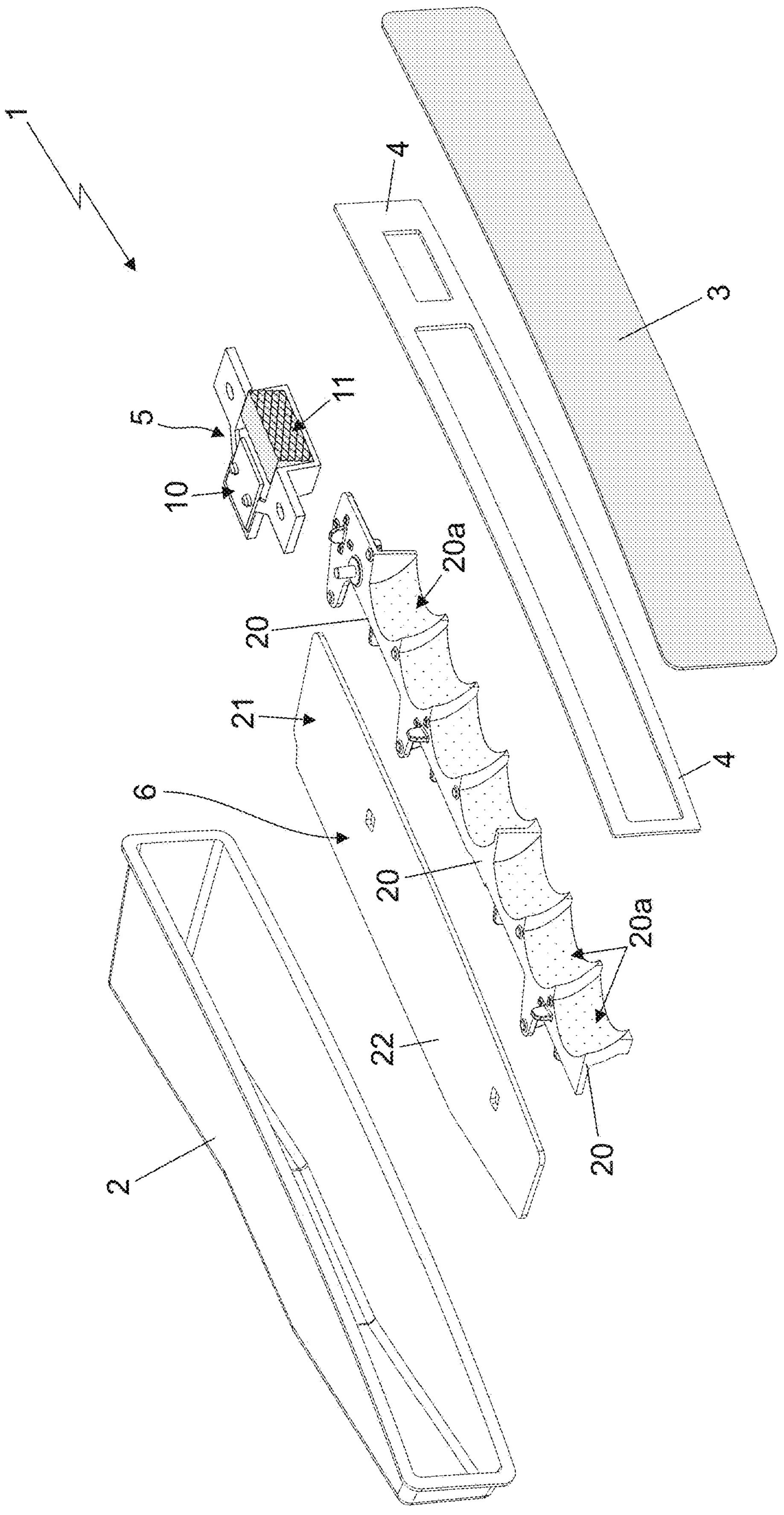
FIG. 2 is a partially exploded, perspective view of the automotive lighting unit shown in FIG. 1, with parts removed for clarity's sake.

With reference to FIGS. 1 and 2, number 1 denotes, as a whole, an automotive lighting unit, which is particularly adapted to be firmly fixed to the rear part of the vehicle body of a car and similar road motor vehicles, and which is structured so as to emit, on command, a light beam that advantageously complies with the photometric type-approval specifications provided for the rear fog light.

In other words, the automotive lighting unit 1 is a lighting device adapted to be firmly fixed to the rear part of the vehicle body of a motor vehicle, and is structured so as to emit, on command, a light beam that advantageously complies with the photometric type-approval specifications provided for the rear fog light.

More specifically, the automotive lighting unit 1 is structured to emit, on command, a preferably red, light beam that has a light intensity and spatial distribution such as to signal the presence/position of the vehicle in event of fog, storm, heavy snowfall, or other poor-visibility environmental conditions.

Preferably, the automotive lighting unit 1 is moreover structured so as to also emit one or more light signals suitable to signal/indicate the position of the vehicle (under normal visibility conditions) and/or the activation of the vehicle brakes and/or the vehicle's turning direction during travel and/or light signals usually emitted by a taillight for road motor vehicles.

In addition, the automotive lighting unit 1 may also be structured to light up the area around the vehicle.

In other words, the automotive lighting unit 1 is adapted to be fixed to the rear part of the vehicle body of a car, van, truck, motorcycle, or other similar motor vehicle, to perform the typical functions of a taillight.

Preferably, the automotive lighting unit 1 is further structured so as to be stably recessed into the vehicle body (not shown) and to surface outside the vehicle.

More specifically, the automotive lighting unit 1 is preferably structured to be stably recessed into the rear part of the vehicle body of a car or other similar motor vehicle.

Naturally, in a different embodiment, the automotive lighting unit 1 could also be structured to be simply fixed cantilevered to the rear part of the vehicle body (not shown).

With reference to FIGS. 1 and 2, firstly the automotive lighting unit 1 comprises: a rear casing 2 with a substantially rigid and opaque structure, which is concave in shape and is adapted to be firmly fixed to the vehicle body (not shown), preferably within a seat specially made in the rear part of the vehicle body; and a front half-shell 3 with a substantially rigid and transparent (to visible light) structure, separate and distinct from the rear casing, which has a roughly lenticular shape and is firmly fixed to the rear casing 2, closing the mouth of the latter, so as to form, together with the rear casing 2, a closed and internally hollow, rigid housing. Preferably, the front half-shell 3 is moreover structured so as to surface on the outside of the vehicle body.

More specifically, the rear casing 2 is preferably shaped substantially like an advantageously oblong basing, and is preferably made of polymeric material, advantageously by injection moulding.

In the example shown the rear casing 2 is preferably made of acrylonitrile-butadiene-styrene (ABS) or other opaque polymeric material.

Preferably, the rear casing 2 moreover has on its outer surface, a number of fixing appendages (not visible in the figures) that allow the rear casing 2 to be rigidly fixed to the vehicle body.

Naturally, in a different embodiment, the rear casing 2 may also be shaped and/or structured to be simply fixed cantilevered to the rear part of the vehicle body. The front half-shell 3, on the other hand, is provided with one or more transparent or semitransparent sectors (i.e. sectors allowing visible light to pass through), optionally also of different colours, and is rigidly fixed to the rear casing 2 preferably in a substantially fluid-tight manner.

Clearly, the front half-shell 3 may also include one or more opaque sectors bordering said transparent or semi-transparent sector(s).

More specifically, the front half-shell 3 is preferably substantially complementary in shape to the mouth of the rear casing 2 and is preferably made of polymeric material, advantageously by injection moulding.

In the example shown the front half-shell 3 is preferably made of transparent polycarbonate (PC), transparent polymethylmethacrylate (PMMA), or other transparent or semi-transparent polymeric material.

In addition, the front half-shell 3 is preferably firmly fixed to the rear casing 2 along the perimeter edge of the mouth of said rear casing 2.

More specifically, the front half-shell 3 is preferably welded directly to the rear casing 2 substantially seamlessly along the entire perimeter rim of the mouth of rear casing 2.

Furthermore, with reference to FIGS. 1 and 2, the automotive lighting unit 1 also comprises one or more electrically-powered lighting assemblies, each of which is located inside the rear casing 2, aligned with a respective transparent or semitransparent sector of front half-shell 3, and is adapted to selectively backlight the corresponding transparent or semitransparent sector of the half-shell, preferably separately and independently of the other lighting assemblies of the automotive light.

More specifically, the/each lighting assembly is structured so as to emit, on command, a light beam that passes through the front half-shell 3, or rather the facing transparent or semitransparent sector of front half-shell 3, and once it has come out of the automotive lighting unit 1, preferably complies with the photometric type-approval specifications (colour, intensity and distribution of the light) provided for a specific function, i.e. for a specific light signal.

Preferably, the/each lighting assembly is furthermore structured so as to emit, on command, a light beam having a predominant component of the light beam oriented parallel to a predetermined optical axis A of the lighting unit, which is advantageously substantially parallel to the vehicle longitudinal axis when the automotive lighting unit 1 is mounted/placed on the vehicle body.

Clearly, one or some of the lighting assemblies of the automotive lighting unit 1 may also emit a light beam which does not comply with or is not required to comply with said photometric type-approval specifications.

Preferably, the automotive lighting unit 1 additionally comprises a shielding mask or frame 4 with a substantially rigid and opaque structure, which is placed inside the rear casing 2, immediately beneath the front half-shell 3, and is shaped so that it hides from sight the lighting assembly(s) of the automotive lighting unit 1, while still allowing the light emitted by the lighting assembly(s) of the automotive lighting unit 1 to reach the front half-shell 3.

More specifically, the shielding mask or frame 4 is preferably provided with one or more through-openings that allow the light produced by said lighting assembly(s) to reach the front half-shell 3.

Figure 3:
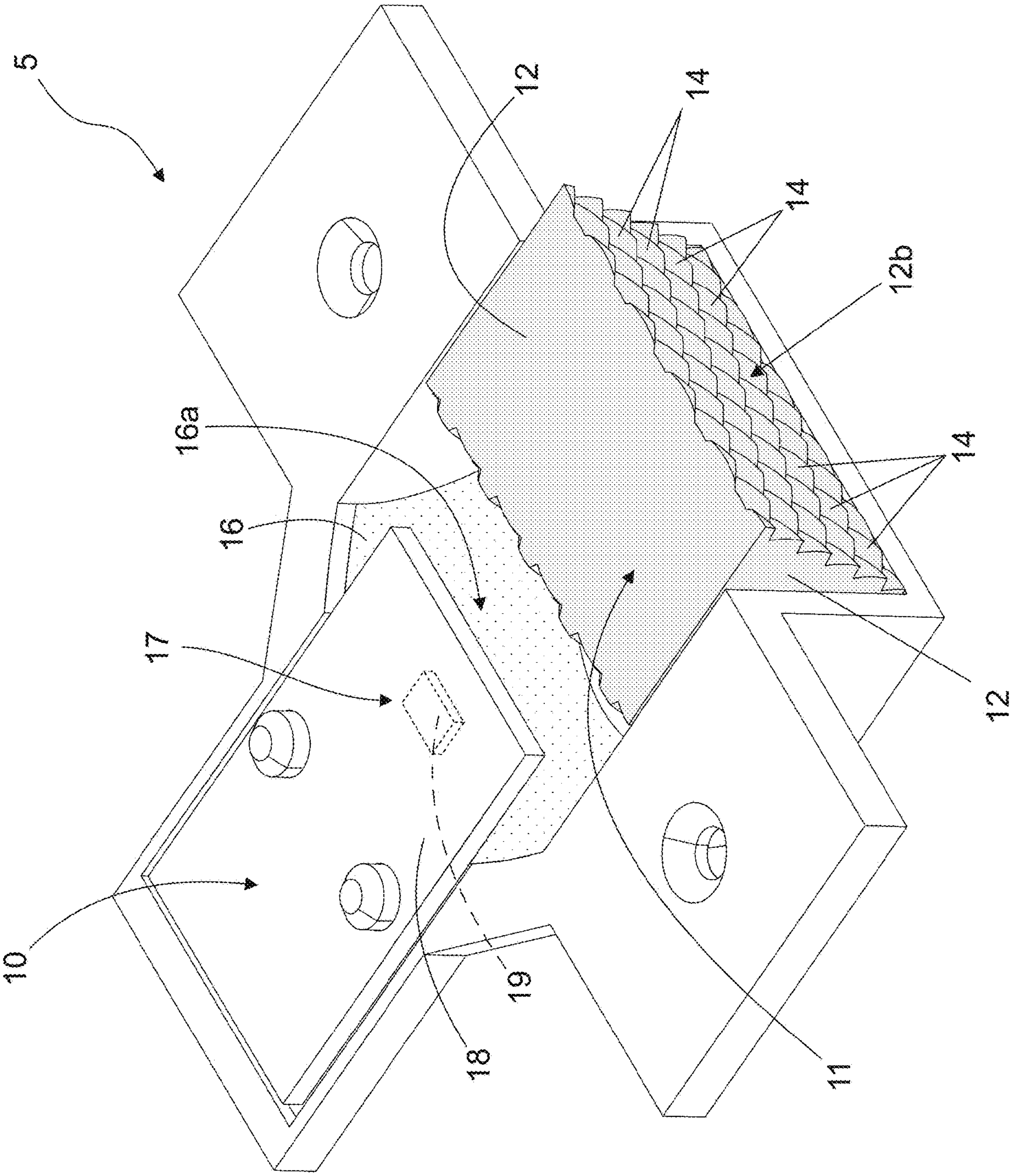
FIG. 3 is a perspective view of one of the lighting assemblies of the automotive lighting unit shown in FIGS. 1 and 2, with parts in transparency and parts removed for clarity's sake.

With reference to FIGS. 1, 2 and 3, in addition, the or at least one of the lighting assembly(s) of the automotive lighting unit 1 is advantageously structured so as to emit a first light beam, which complies with the photometric type-approval specifications (colour, intensity and distribution of the light) provided for the rear fog light.

In other words, the automotive lighting unit 1 comprises at least one first lighting assembly, which is structured to emit, on command, a first light beam that advantageously complies with the photometric type-approval specifications (colour, intensity and distribution of the light) provided for the rear fog light.

More specifically, the light beam emitted by said first lighting assembly preferably complies with the photometric type-approval specifications provided for, for example, by the FMVSS/SAE J1319 and subsequent regulations and/or by the UNECE-R38 and subsequent regulations.

In the example shown, the automotive lighting unit 1 is preferably provided with two lighting assemblies that are separate and distinct from each other.

The first lighting assembly, hereinafter denoted with the number 5, is structured to emit a first light beam, which advantageously complies with the photometric type-approval specifications (colour, intensity and distribution of the light) provided for the rear fog light.

On the other hand, the second lighting assembly, hereinafter denoted with the number 6, is structured so as to emit a second light beam, which advantageously complies with the photometric type-approval specifications (colour, intensity and distribution of the light) provided for another type of light signal usually emitted by a taillight for cars and similar vehicles.

Preferably, this other/second type of light signal may be, for example, the light beam or signal that signals/indicates the activation of the vehicle brakes; the light beam or signal that signals/indicates the vehicle's turning direction during travel; or the light beam or signal that signals/indicates the position of the vehicle under normal visibility conditions, i.e. in the absence of fog, storms, heavy snowfall, or other poor-visibility environmental conditions.

With reference to FIGS. 1 to 7, in addition, the lighting assembly 5 comprises: an electrically-powered light source 10, which is located inside the casing 2 and is adapted to emit and direct, on command, a light beam, which is advantageously collimated or quasi-collimated, towards the front half-shell 3, or rather towards a corresponding transparent or semitransparent sector of the front half-shell 3; and Kohler optics 11, which is interposed between the light source 10 and the front half-shell 3, so as to be crossed by the light beam coming from the light source 10, and is structured so as to give the light beam reaching the front half-shell 3 a pre-established shape (cross-section), advantageously also distributing the light intensity in a roughly uniform manner within said pre-established shape.

More specifically, the light source 10 is preferably structured to direct, towards Kohler optics 11, a light beam collimated or quasi-collimated in a predetermined direction d, which is advantageously substantially parallel to the lighting-unit optical axis A.

The term quasi-collimated refers to a light beam directed in direction d and having an opening angle advantageously less than 15°, and more conveniently, even less than 10°.

Kohler optics 11, on the other hand, is structured so as to give the light beam coming out of the same optics directed towards the front half-shell 3 a pre-established shape (cross-section orthogonal to the beam collimation direction d), which is determined (solely) by the shape of the opposing elemental lenses which contribute to form the same Kohler optics 11.

In other words, Kohler optics 11 is structured to give the light beam coming out of the same optics directed towards the front half-shell 3 a pre-established spatial distribution of the light intensity, which is determined (solely) by the shape of the lenses which contribute to form said Kohler optics 11.

More specifically, the shape of the light beam coming out of Kohler optics 11, i.e. the spatial distribution of the light intensity of the light beam coming out of Kohler optics 11, is determined (solely) by the shape of the (external) perimeter of the various opposing elemental lenses that contribute to form said Kohler optics 11. In other words, the Kohler optics 11 advantageously lacks intermediate shielding bodies which are interposed between the various opposing elemental lenses that contribute to form said Kohler optics 11, and may hinder the travelling of the light beam coming from the light source 10 through the Kohler optics 11.

Advantageously, at same time the Kohler optics 11 is moreover adapted to substantially collimate the light beam in direction d.

More specifically, the Kohler optics 11 is structured so as to give, to the light beam that comes out of Kohler optics 11 and reaches the front half-shell 3, a shape (cross-section) that substantially copies, or rather is substantially equal to, that of the (external) perimeter of the opposing elemental lenses that contribute to form said Kohler optics 11.

In other words, Kohler optics 11 is structured to generate a light beam, which is advantageously substantially collimated in direction d and has a pre-established shape determined by the shape of the lenses that contribute to form said Kohler optics 11.

Advantageously, Kohler optics 11 is further capable of distributing the intensity of the light in a substantially uniform manner within said light beam.

In addition, the Kohler optics 11 is advantageously structured and oriented to give to the light beam coming out of the front half-shell 3, a shape and spatial distribution of the light intensity which are optimized to perform the rear fog light function.

In other words, the Kohler optics 11 is preferably structured so as to give the light beam coming out of the front half-shell 3 a spatial distribution of the light intensity, which complies with the photometric type-approval specifications provided for by the UNECE-R38 and subsequent regulations and/or by the FMVSS/SAE J1319 and subsequent regulations.

More specifically, Kohler optics 11 is preferably structured to give to the light beam reaching the front half-shell 3 a substantially rhomboidal shape (cross-section), which advantageously complies with the photometric type-approval specifications (colour, intensity and distribution of the light) provided for the rear fog light. Advantageously, the light intensity is moreover distributed in a substantially uniform manner within said substantially rhomboidal shape.

Furthermore, the lighting assembly 5, or rather Kohler optics 11, is preferably arranged inside the casing 2 so that the longest diagonal of said substantially rhomboidal shape is substantially horizontal.

Figure 8:
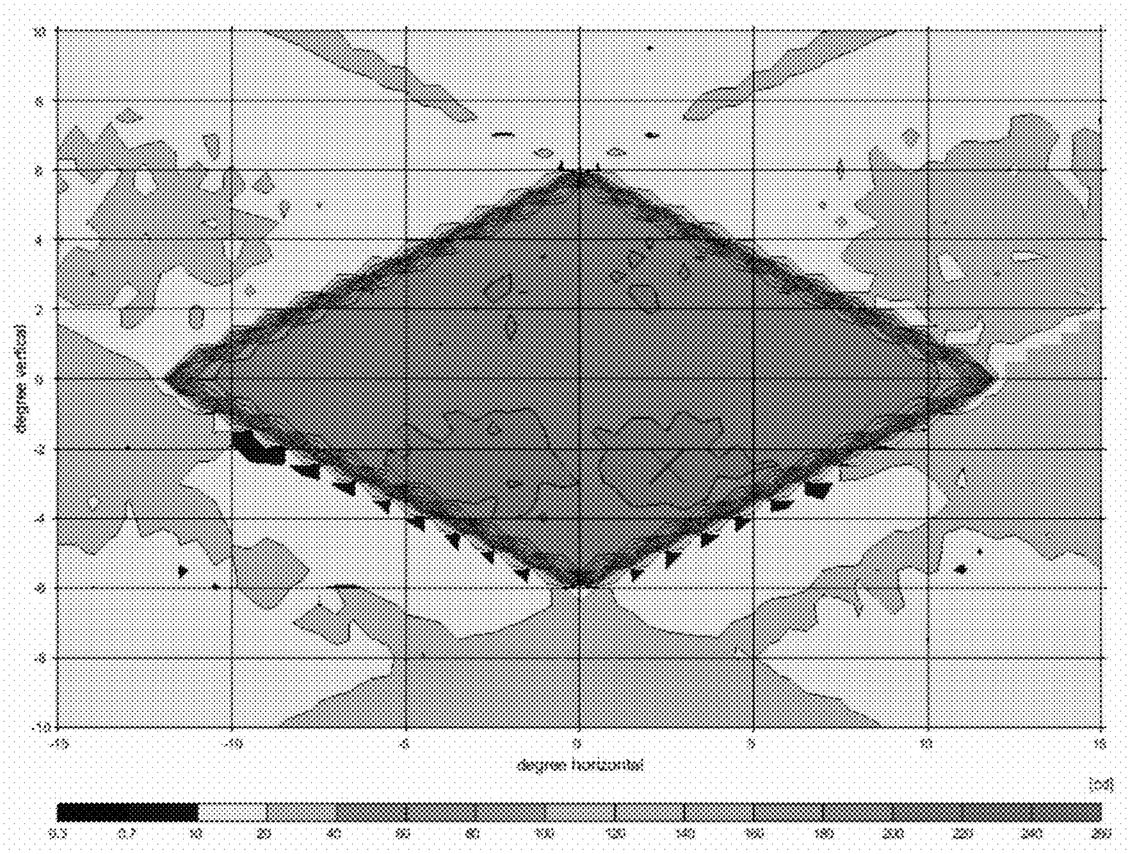

In particular, the isocandela diagram in FIG. 8 shows, in a schematic and suitably simplified manner, the spatial distribution of the light intensity of the light beam produced by the lighting assembly 5, or rather by the Kohler optics 11.

The isocandela diagram in FIG. 8 moreover shows that the intensity of the light emitted by the lighting assembly 5 remains very high only within a limited area substantially rhomboidal in shape, which is placed in the centre of the same isocandela diagram.

With reference to FIGS. 1 to 7 Kohler optics 11 has a light-inlet face facing the light source 10, and a light-outlet face opposite said light-inlet face and facing the front half-shell 3.

More specifically, the light-inlet face and the light-outlet face of Kohler optics 11 are preferably aligned one after the other along the collimation direction d of the light beam coming from the light source 10 and/or along the lighting-unit optical axis A.

In addition, the light-inlet face of Kohler optics 11 comprises a first array of small convex/converging elemental lenses, advantageously with a substantially spherical geometry, which have their focus on the side opposite the light source 10.

Preferably, the elemental converging lenses present on the light-inlet face of Kohler optics 11 moreover have all substantially the same shape. More specifically, the shape of the perimeter of the elemental converging lenses on the light-inlet face of Kohler optics 11 is substantially the same for all lenses.

On the other hand, the light-outlet face of Kohler optics 11 comprises a second array of small convex/converging elemental lenses, advantageously with a substantially spherical geometry, which have their focus on the side opposite the front half-shell 3.

Preferably, the elemental lenses on the light-outlet face of Kohler optics 11 moreover have all substantially the same shape. More specifically, the shape of the perimeter of the elemental converging lenses on the light-outlet face of Kohler optics 11 is substantially the same for all lenses.

In addition, each converging lens of the light-inlet face of Kohler optics 11 is substantially aligned with and opposite to a respective converging lens of the light-outlet face, and is shaped so that its focus is advantageously located on the same converging lens of the light-outlet face, or more conveniently, substantially on the convex surface of the same converging lens, and vice versa.

In addition, each converging lens of the light-outlet face of Kohler optics 11 has substantially the same shape as the corresponding and facing converging lens of the light-inlet face of said Kohler optics 11.

In the example shown the converging lenses that contribute to form the light-inlet face and the converging lenses that contribute to form the light-outlet face of Kohler optics 11 are preferably substantially rhomboidal in shape.

Preferably, the converging lenses that contribute to form the light-inlet face and the converging lenses that contribute to form the light-outlet face of Kohler optics 11 are moreover oriented such that the longest diagonal of said rhomboidal shape is substantially horizontal.

More specifically, with reference to FIGS. 2 to 7, Kohler optics 11 preferably comprises a transparent body 12 with substantially rigid and advantageously also monolithic structure, which has a first face 12*a* turned towards the light source 10 and a second face 12*b* opposite said first face 12*a* and turned towards the front half-shell 3. Preferably, the transparent body 12 is moreover oriented so that the faces 12*a* and 12*b* are aligned one after the other along the collimation direction d and/or along the lighting-unit optical axis A.

The transparent body 12 is therefore structured to allow the light coming from the light source 10 to freely pass (i.e. unobstructed) from the first face 12*a* to the second face 12*b*.

In addition, the surface of the first face 12*a* of transparent body 12 has a bossage profile with a complex three-dimensional structure, which comprises a plurality of small convex lenticular protrusions 13 that are arranged adjacent to one another and advantageously have a substantially spherical geometry (i.e. the convex surface has a substantially constant radius of curvature).

In addition, the convex lenticular protrusions 13 preferably all have substantially the same three-dimensional shape and/or are preferably arranged adjacent to each other in a quincunx distribution.

Preferably, the perimeter of the various convex lenticular protrusions 13 of the first face 12*a* moreover is substantially rhomboidal in shape, advantageously with the longest diagonal of the rhombus/rhomboid arranged substantially horizontally.

In other words, the base of each convex lenticular protrusion 13 is substantially rhomboidal in shape.

Similarly to the surface of face 12*a*, also the surface of the second face 12*b* of transparent body 12 has a bossage profile with a complex three-dimensional structure, which comprises a plurality of small convex lenticular protrusions 14 that are arranged adjacent to one another and advantageously have a substantially spherical geometry (i.e. the convex surface has a substantially constant radius of curvature).

In addition, the convex lenticular protrusions 14 preferably have all substantially the same three-dimensional shape and/or are preferably arranged adjacent to each other in a quincunx distribution.

In addition, the shape of the perimeter and the orientation of the convex lenticular protrusions 14 preferably substantially copy the shape of the perimeter and the orientation of the convex lenticular protrusions 13.

In other words, the perimeter of the various convex lenticular protrusions 14 of face 12*b* is preferably substantially rhomboidal in shape.

More specifically, the base of each convex lenticular protrusion 14 is preferably substantially rhomboidal in shape.

Figure 5:
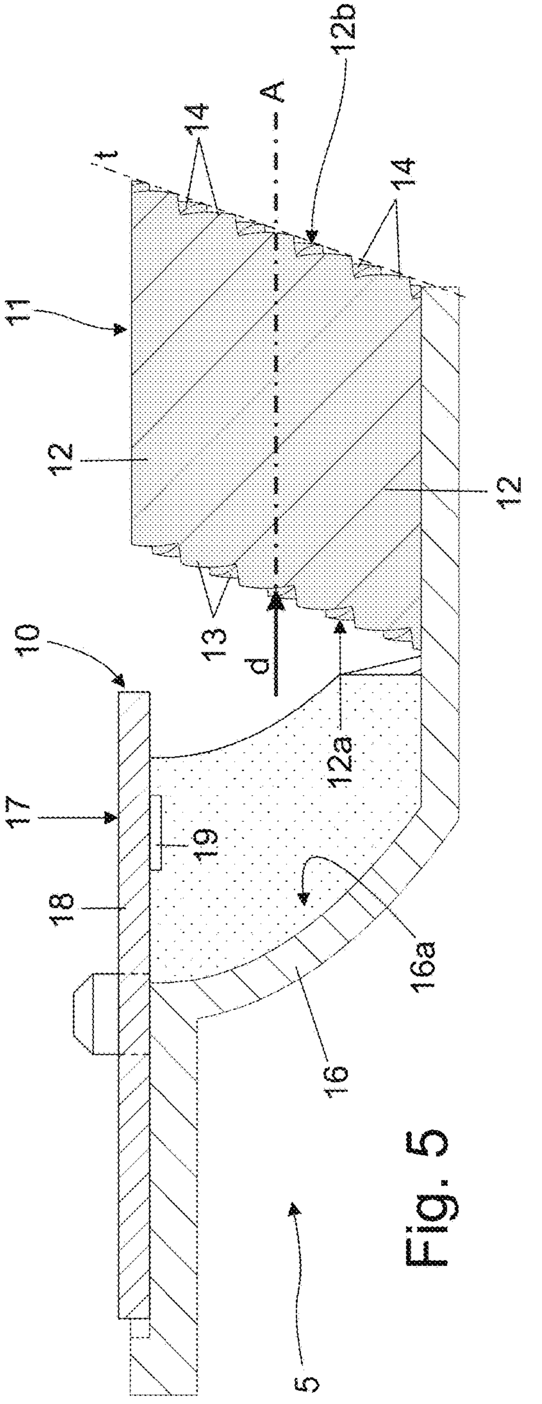
FIG. 5 is a side view of the lighting unit shown in FIGS. 2, 3 and 4, sectioned along the mid-plane and with parts removed for clarity's sake.
Figure 7:
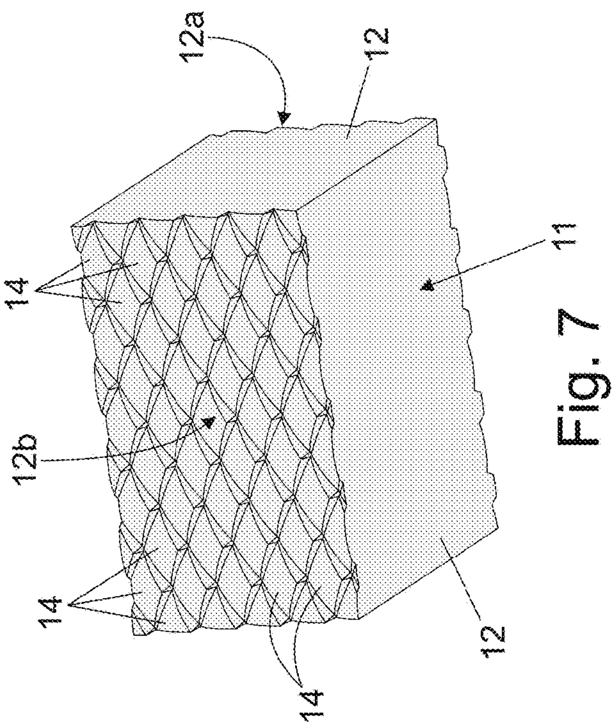
FIGS. 6 and 7 are perspective views of the optics present in the lighting assembly shown in FIGS. 2, 3, 4 and 5; and, FIG. 8 is an isocandela diagram of the light beam with rear fog light function emitted by the automotive lighting unit made according to the teachings of the present invention.
Figure 6:
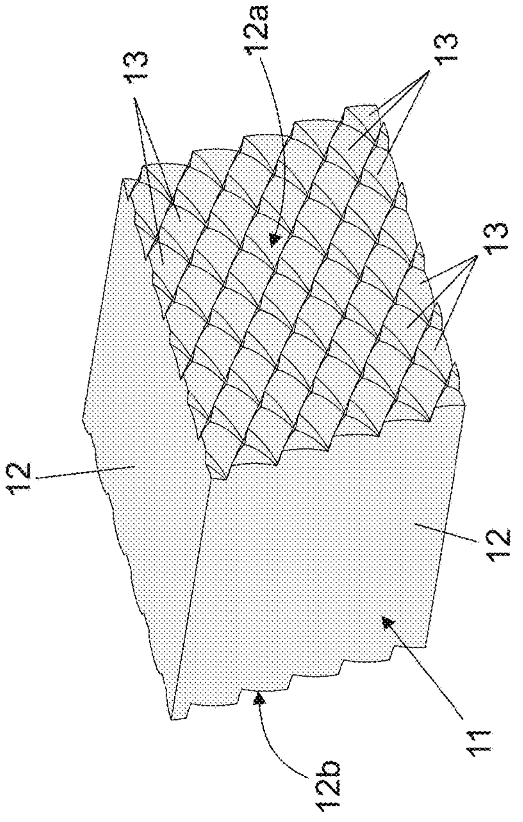

With reference to FIG. 5, in addition, each convex lenticular protrusion 14 of face 12*b* is preferably aligned with a respective convex lenticular protrusion 13 of first face 12*a*, and vice versa.

Moreover, each convex lenticular protrusion 14 of face 12*b* is advantageously shaped such that its focus is located substantially on the convex surface of the convex lenticular protrusion 13 associated therewith, i.e. on the convex surface of the convex lenticular protrusion 13 which the same convex lenticular protrusion 14 is aligned to.

Similarly, each convex lenticular protrusion 13 of face 12*a* is advantageously shaped such that its focus is located substantially on the convex surface of the convex lenticular protrusion 14 associated therewith, i.e. on the convex surface of the convex lenticular protrusion 14 which the same convex lenticular protrusion 13 is aligned to.

In other words, each lenticular protrusion 14 of transparent body 12 is locally aligned to a respective lenticular protrusion 13 and is shaped so that its focus is placed on the convex surface of the same lenticular protrusion 13, and vice versa.

Preferably, the bossage profile with a complex three-dimensional structure of the second face 12*b* of transparent body 12 is finally substantially equal to the bossage profile with a complex three-dimensional structure of the first face 12*a*.

In other words, the shape, dimensions, and surface distribution of the convex lenticular protrusions 14 are substantially the same as the shape, dimensions, and surface distribution of the convex lenticular protrusions 13.

The first face 12*a* of transparent body 12, therefore, corresponds to the light-inlet face of Kohler optics 11, and the second face 12*b* of transparent body 12 corresponds to the light-outlet face of Kohler optics 11.

In other words, each converging lens of the light-inlet face of Kohler optics 11 corresponds to a respective lenticular protrusion 13 of transparent body 12, whereas each converging lens of the light-outlet face of Kohler optics 11 corresponds to a respective lenticular protrusion 14 of transparent body 12.

Preferably, the dimensional ratios between the longest diagonal and the shortest diagonal of the rhomboidal perimeter of the convex lenticular protrusions 13 advantageously copy those of the figure drawn out, in a traditional isocandela diagram centred on the optical axis of the lighting unit, by an ideal light beam compliant with the photometric type-approval specifications provided for the rear fog light.

More specifically, the height-to-width ratio of the convex lenticular protrusions 13 and 14 advantageously corresponds to that of the light beam required by the photometric type-approval specifications corresponding to UNECE-R38 and subsequent regulations and/or to FMVSS/SAE J1319 and subsequent regulations.

In this way, each convex lenticular protrusion 13 of transparent body 12 and the corresponding, facing convex lenticular protrusion 13 are able to generate, downstream of the same transparent body 12, an advantageously substantially collimated, light beam that has a shape (cross-section) substantially equal to the shape of the perimeter of the same lenticular protrusions 13 and 14, that is, a rhomboidal shape.

With reference to FIGS. 3 to 7, in the example shown, in particular, the transparent body 12 is preferably made of transparent polycarbonate (PC), transparent polymethylmethacrylate (PMMA), or other transparent polymeric material, advantageously by injection moulding.

In addition, the faces 12*a* and 12*b* of transparent body 12 preferably have a stepped profile, and the plane t tangent to the steps is inclined, with respect to the collimation direction d of the light beam and/or to the optical axis A of the lighting unit, of an angle advantageously ranging between 60° and 80°.

Preferably, the transparent body 12 is finally free of intermediate shielding elements or inserts that may obstruct the passage of the light beam emitted by the light source 10, from the light-inlet face 12*a* to the light-outlet face 12*b*.

With reference to FIGS. 2, 3, 4 and 5, on the other hand, the light source 10 preferably comprises: a reflector body 16 with a substantially rigid and opaque structure, which is placed inside the rear casing 2, behind and aligned to said Kohler optics 11, or rather to the transparent body 12, and is provided with a concave reflecting surface 16*a* advantageously with a roughly semi-parabolic profile, which is oriented so as to reflect the incident light towards the facing Kohler optics 11, or rather towards the face 12*a* of transparent body 12; and an electrically-powered light emitting device 17, which emits light on command and is placed inside the rear casing 2, beside the reflector body 16, and preferably also close to the back of the rear casing 2, so as to direct the generated light towards the concave reflecting surface 16*a* of reflector body 16.

Preferably, said light emitting device 17 moreover includes one or more LEDs (acronym of Light Emitting Diodes), which are placed beside the reflector body 16, preferably close to the back of rear casing 2, and are oriented to direct the generated light towards the concave reflecting surface 16*a*.

More specifically, the reflector body 16 is preferably made of polymeric material advantageously via injection moulding, and its concave reflecting surface 16*a* is preferably shaped so as to reflect, towards the Kohler optics 11, or rather towards the light-inlet face 12*a* of transparent body 12, the light coming from the light emitting device 17, thus forming a light beam advantageously collimated or quasi-collimated in a direction d preferably substantially parallel to the optical axis A.

Preferably, the reflector body 16 is furthermore structured to rigidly couple to said Kohler optics 11, or rather to the transparent body 12, advantageously to stably support the latter.

In other words, the light source 10 is preferably structured to directly supports the Kohler optics 11.

More specifically, the light source 10 and the Kohler optics 11, or rather the transparent body 12, are preferably structured to form an independent pre-assembled module.

In the example shown, in particular, also the reflector body 16 is preferably made of acrylonitrile-butadiene-styrene (ABS) or other opaque polymeric material, whereas its concave reflecting surface 16*a* preferably has a substantially semi-parabolic profile with a complex three-dimensional structure and is preferably mirror-metallized.

Figure 4:
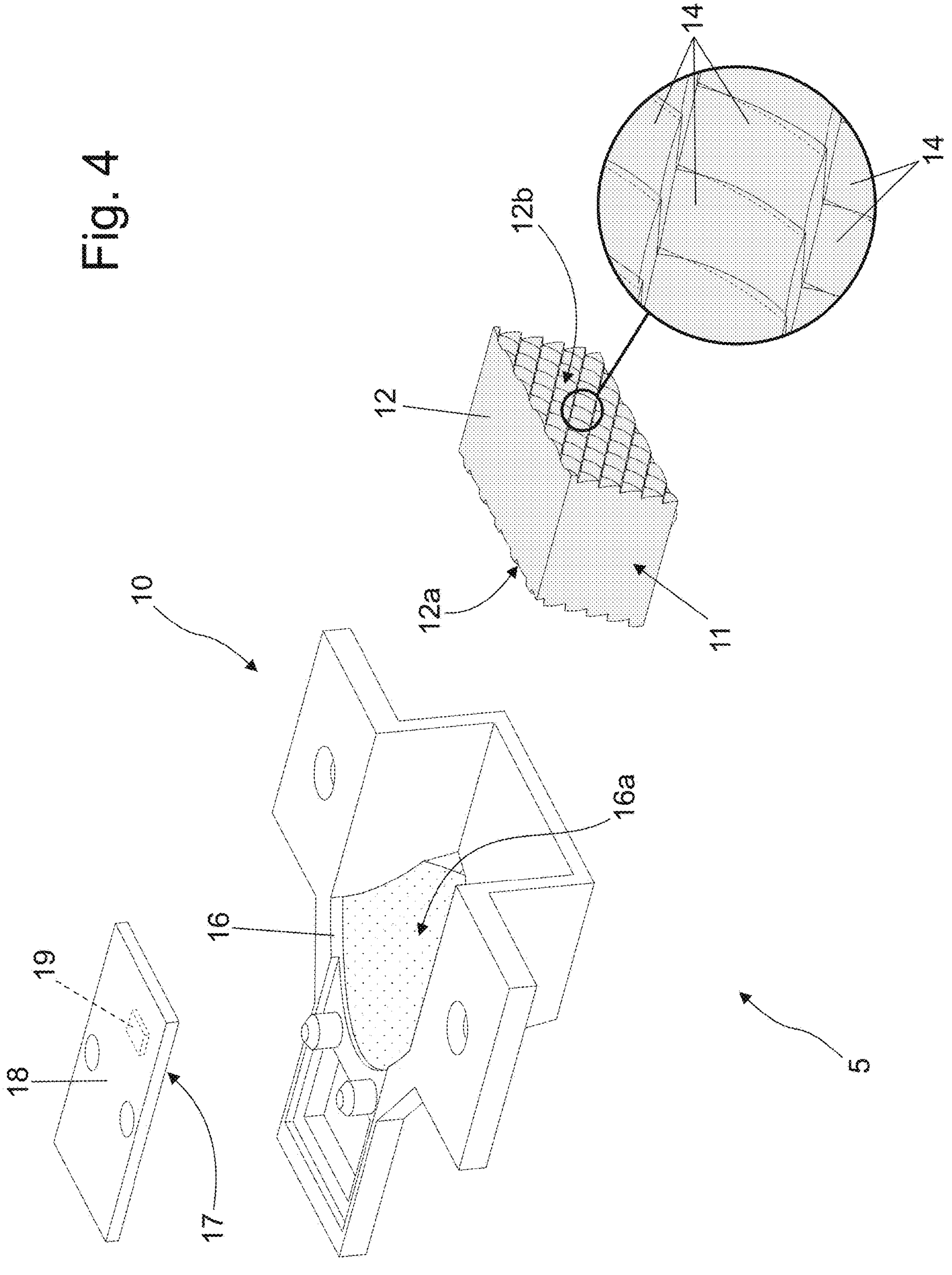
FIG. 4 is a partially exploded, perspective view of the lighting assembly of FIG. 3, with parts in transparency and parts removed for clarity.

With reference to FIGS. 3 and 4, on the other hand, the light emitting device 17 preferably comprises: at least one printed circuit board 18, which is arranged flush with or firmly abutting the reflector body 16, beside the concave reflecting surface 16*a*; and at least one LED 19, which is placed on the printed circuit board 18 so as to directly face the concave reflecting surface 16*a* of reflector body 16. Preferably, though not necessarily, the printed circuit board 18 also accommodates the electronics adapted to power and/or command the LED(s) 19.

With particular reference to FIG. 2, on the other hand, the lighting assembly 6 preferably comprises: an oblong reflector body 20 with a substantially rigid and opaque structure, which is preferably made of opaque polymeric material and is arranged inside the rear casing 2, preferably close to the back thereof, and has a plurality of concave reflecting surfaces 20*a*, preferably with a substantially semi-parabolic profile, which are arranged adjacent to each other and are oriented so as to reflect the incident light towards the facing transparent or semitransparent sector of the front half-shell 3; and a second electrically-powered light emitting device 21, which emits light on command and is arranged inside the rear casing 2, beside the oblong reflector body 20 and preferably also close to the back of the rear casing 2, so as to direct the generated light towards the various concave reflecting surfaces 20*a* of the same oblong reflector body 20.

Preferably, also the second light emitting device 21 moreover includes a plurality of LEDs (acronym of Light Emitting Diodes), which are arranged beside the oblong reflector body 20, preferably close to the back of the rear casing 2, and are oriented so as to direct the generated light towards the various concave reflecting surfaces 20*a* of the same oblong reflector body 20.

More specifically, the light emitting device 21 preferably comprises: at least one printed circuit board 22, which is arranged flush with or firmly abutting the oblong reflector body 20, beside the various concave reflecting surfaces 20*a*; and a series of LEDs (not visible in the figure) which are arranged on the printed circuit board 22 so as to face each a corresponding concave reflecting surface 20*a* of the oblong reflector body 20.

With reference to FIGS. 1 and 2, the shielding mask 4, in turn, preferably has a plate-like structure and is preferably provided with two large through-openings that are aligned one to the lighting assembly 5, or rather to Kohler optics 11 (or rather to the light-outlet face 12*b* of the transparent body 12), and the other to the lighting assembly 6, or rather to the various concave reflecting surfaces 20*a* of the oblong reflector body 20.

General operation of the automotive lighting unit 1 is easily inferable from the above description and thus requires no further explanation.

As regards instead the lighting assembly 5, patent application US2011/0228231 describes an image projector using Kohler optics to project, onto a screen, an image obtained by superimposing a series of tiny sample slides located inside Kohler optics.

Through experimental tests, instead, the owner of this patent application has found that the Kohler optics, when it does not incorporate slides between the lenses, is capable of projecting, onto a generic surface, a luminous outline whose shape substantially copies that of the elemental lenses that contribute to form the same Kohler optics.

The same experimental tests have also shown that the luminous outline is the result of superimposing a series of luminous outlines separately made by the various pairs of lenses of Kohler optics, and that the light intensity remains substantially uniform within the whole luminous outline.

The lighting assembly 5 does not use the Kohler optics 11 to project an image onto the road surface, but instead uses the Kohler optics 11 to produce a substantially horizontal light beam that has, a predetermined light-intensity spatial distribution with respect to the optical axis A of the lighting unit, which is substantially exclusively determined by the shape of the elemental lenses that contribute to form the same Kohler optics 11.

More specifically, the lighting assembly 5 uses the particular behaviour of the Kohler optics 11 to produce a light beam parallel to the ground, which complies with the photometric type-approval specifications provided for the rear fog light.

In other words, according to the physical principles of Kohler optics, each converging lens of the light-inlet face of Kohler optics 11, or rather each lenticular protrusion 13 of transparent body 12, and the corresponding, facing converging lens of the light-outlet face, or rather the corresponding, facing lenticular protrusion 14 of transparent body 12, are able to concentrate the light coming from the light source 11, in such a way as to form a light beam advantageously substantially collimated in direction d, which has substantially the same shape as the perimeter of the two converging lenses that are crossed, or rather of the lenticular protrusions 13 and 14 that are crossed.

The advantages resulting from the presence of the Kohler optics 11 are noteworthy.

The Kohler optics 11 is capable of producing a light beam that complies with the photometric type-approval specifications provided for the rear fog light via using almost all the light emitted by the light source 10, or rather by the LED 19, thus significantly increasing the efficiency of the automotive lighting unit.

In addition, the Kohler optics 11 does not require perfect alignment between the light source 10 and the same Kohler optics 11, greatly simplifying the assembly steps of the light assembly 5, and consequently, of the automotive lighting unit 1.

Furthermore, the stepped profile of the faces 12*a* and 12*b* of transparent body 12 greatly simplifies the moulding of the piece, because it eliminates any undercut in the piece to be moulded and therefore in the mould.

Last but not least, the light source 10 and the Kohler optics 11, or rather the transparent body 12, can form a pre-assembled, pre-configured rear fog lamp module, which can be easily placed inside a rear casing of any shape and/or size, greatly simplifying the design and prototyping of future automotive lighting units.

Lastly, modifications and variations may be made to the automotive lighting unit 1 without however departing from the scope of the present invention.

For example, the converging lenses on the light-inlet face and on light-outlet face of Kohler optics 11, or rather the convex lenticular protrusions 13 and 14 on faces 12*a* and 12*b* of transparent body 12, may be substantially rectangular or elliptical in shape.

In fact, the FMVSS/SAE J1319 regulations and/or UNECE-R38 regulations can also be met by a light beam which can be schematically represented, in a conventional isocandela diagram centred on the optical axis A of the lightning unit, by an ellipsoidal or rectangular area that circumscribes and, as far as possible, approximates by excess the reference rhomboidal quadrilateral provided for by the photometric type-approval specifications.

The invention claimed is:

1. An automotive lighting unit comprising:

a rear casing adapted to be fixed to the vehicle; a front half-shell with a substantially transparent structure, which is arranged to close the mouth of said rear casing; and at least one lighting assembly, which is located inside the rear casing and is adapted to backlight a corresponding transparent or semi-transparent sector of the front half-shell comprises:

a light source, which is placed inside the casing and is adapted to emit and direct a light beam towards the front half-shell; and, a Kohler optics, which is interposed between the light source and the front half-shell, so as to be crossed by the light beam arriving from the light source, and is structured so as to give, to the light beam reaching the front half-shell, a pre-established shape determined by the shape of the lenses that contribute to form said Kohler optics.

2. The automotive lighting unit according to claim 1, wherein said Kohler optics is provided with a light-inlet face that faces the light source and comprises a series of first converging lenses having their focus on the side opposite said light source, and a light-outlet face, opposite said light-inlet face, that faces the front half-shell and comprises an array of second converging lenses having their focus on the side opposite said front half-shell; each first converging lens of said light-inlet face being aligned and opposite to a respective second converging lens of said light-outlet face and being furthermore shaped so that its focus is placed on the same second converging lens of the light-outlet face, and vice versa.

3. The automotive lighting unit according to claim 2, wherein the first converging lenses of said light-inlet face have substantially the same shape as the second converging lenses of said light-outlet face.

4. The automotive lighting unit according to claim 2, wherein the first converging lenses of the light-inlet face and/or the second converging lenses of the light-outlet face are substantially rhomboidal in shape.

5. The automotive lighting unit according to claim 2, wherein the first converging lenses of the light-inlet face and/or the second converging lenses of the light-outlet face have a spherical geometry.

6. The automotive lighting unit according to claim 2, wherein Kohler optics comprises a transparent body with a substantially rigid structure, which has a first face turned towards said light source and a second face opposite said first face and turned towards said front half-shell; the surface of said first face having a first bossage profile with a complex three-dimensional structure comprising a plurality of first convex lenticular protrusions arranged adjacent to one another; the surface of said second face having a second bossage profile with a complex three-dimensional structure comprising a plurality of second convex lenticular protrusions arranged adjacent to one another.

7. The automotive lighting unit according to claim 6, wherein each second convex lenticular protrusion is aligned to a respective first convex lenticular protrusion.

8. The automotive lighting unit according to claim 6, wherein the shape of the perimeter of said second convex lenticular protrusions is substantially the same as the shape of the perimeter of said first convex lenticular protrusions.

9. The automotive lighting unit according to claim 6, wherein said first and/or second convex lenticular protrusions have a spherical geometry.

10. The automotive lighting unit according to claim 6, wherein the shape of said first bossage profile with a complex three-dimensional structure is substantially the same as the shape of said second bossage profile with a complex three-dimensional structure.

11. The automotive lighting unit according to claim 1, wherein said light source is structured so as to direct, towards said Kohler optics, a light beam substantially collimated in a predetermined direction.

12. The automotive lighting unit according to claim 1, wherein said light source comprises: a reflector body, which is located inside the rear casing, behind the Kohler optics, and has a concave reflecting surface oriented so as to reflect the incident light towards the facing Kohler optics; and an electrically-powered light emitting device, which emits light on command and is placed inside the rear casing, beside the reflector body, so as to direct the generated light towards the concave reflecting surface of said reflector body.

13. The automotive lighting unit according to claim 12, wherein said light emitting device includes one or more LEDs.

14. The automotive lighting unit according to claim 1, wherein said light source is structured so as to support said Kohler optics.

15. The automotive lighting unit according to claim 1, wherein said Kohler optics is structured to shape the light beam coming from said light source so that it complies with the photometric type-approval specifications provided for the rear fog light.

16. The automotive lighting unit according to claim 3, wherein the first converging lenses of the light-inlet face and/or the second converging lenses of the light-outlet face are substantially rhomboidal in shape.

17. The automotive lighting unit according to claim 3, wherein the first converging lenses of the light-inlet face and/or the second converging lenses of the light-outlet face have a spherical geometry.

18. The automotive lighting unit according to claim 4, wherein the first converging lenses of the light-inlet face and/or the second converging lenses of the light-outlet face have a spherical geometry.

19. The automotive lighting unit according to claim 7, wherein the shape of the perimeter of said second convex lenticular protrusions is substantially the same as the shape of the perimeter of said first convex lenticular protrusions.

* * * * *